(12) United States Patent
Chen et al.

(10) Patent No.: US 9,038,311 B2
(45) Date of Patent: May 26, 2015

(54) WETTABLE PEAT MOSS, METHOD OF PREPARATION, AND METHOD OF USE

(71) Applicant: RHODIA OPERATIONS, Aubervillers (FR)

(72) Inventors: Zhiyun Chen, Jersey City, NJ (US); Jean-Christophe Castaing, Sèvres (FR); Krish Shanmuga, Plainsboro, NJ (US)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/026,066

(22) Filed: Sep. 13, 2013

(65) Prior Publication Data

US 2014/0069158 A1    Mar. 13, 2014

Related U.S. Application Data

(60) Provisional application No. 61/700,556, filed on Sep. 13, 2012.

(51) Int. Cl.
*C05F 11/02* (2006.01)
*A01G 1/00* (2006.01)
*C05G 3/06* (2006.01)
*A01G 31/00* (2006.01)
*C05F 11/04* (2006.01)

(52) U.S. Cl.
CPC ... *C05G 3/06* (2013.01); *A01G 1/00* (2013.01); *C05F 11/02* (2013.01); *A01G 31/001* (2013.01); *C05F 11/04* (2013.01)

(58) Field of Classification Search
USPC .......... 71/24; 252/194; 47/59 R, 59 S, 58.1 R
See application file for complete search history.

(56) References Cited

U.S. PATENT DOCUMENTS

| 5,867,937 A | * | 2/1999 | Templeton .................... 47/59 R |
| 6,329,319 B1 | | 12/2001 | Puglisi et al. |
| 6,455,149 B1 | | 9/2002 | Hagen et al. |
| 6,711,850 B2 | | 3/2004 | Yelanich et al. |
| 2002/0108416 A1 | * | 8/2002 | Johnston ........................... 71/24 |
| 2007/0148200 A1 | * | 6/2007 | Stringfellow ................. 424/405 |
| 2008/0172937 A1 | * | 7/2008 | Palmer et al. ............ 47/58.1 SC |
| 2009/0181849 A1 | | 7/2009 | Detweiler et al. |
| 2010/0099717 A1 | | 4/2010 | Vermeer et al. |
| 2012/0142530 A1 | | 6/2012 | Michalow et al. |
| 2013/0036668 A1 | * | 2/2013 | Chen et al. .................... 47/59 R |

FOREIGN PATENT DOCUMENTS

| CA | 2011191 | * | 1/1991 |
| WO | WO2012022164 A1 | | 2/2012 |

OTHER PUBLICATIONS

The International Search Report and the Written Opinion of the International Searching Authority by Korean Intellectual Property Office dated Dec. 18, 2013.

* cited by examiner

*Primary Examiner* — Wayne Langel

(57) ABSTRACT

A composition comprising peat moss and one or more alkoxylates selected from the group consisting of alcohol alkoxylates and alkylphenol alkoxylates and, optionally, one or more polysaccharides, for example guars and/or guar derivatives. A synergistic effect of a combination of the alkoxylates and the polysaccharides was discovered. A method of preparing the peat moss composition and a method of using it are also disclosed.

17 Claims, No Drawings

WETTABLE PEAT MOSS, METHOD OF PREPARATION, AND METHOD OF USE

CROSS REFERENCE TO RELATED APPLICATIONS

Benefit of U.S. provisional patent application 61/700,556 filed Sep. 13, 2012 is claimed.

BACKGROUND OF THE INVENTION

This invention relates to the field of peat moss, more particularly to improving the wettability of peat moss.

According to the current state of the art, surfactants are used commonly as wetting agents in the peat moss industry. For example, in U.S. Pat. No. 5,867,937, Templeton describes the use of EO-PO polymers and silica to relieve hydrophobicity of peat moss, bark, and rockwool in soilless mixes used for plant growth, promoting easier, faster, and more even watering of such mixes without plant injury. Hagen, et al., U.S. Pat. No. 6,455,149, describes water swellable peat pellets including peat moss, a pH adjusting agent, a wetting agent, and an optional processing additive with a preferred bulk density of about 300 to about 600 kg/m$^3$. The wetting agent can be nonionic surfactants such as copolymerized alkane oxides, for example ethylene oxide-propylene oxide copolymers (EO-PO). A peat moss composition having improved water holding capacity, hydrophilicity, and/or anti-leaching properties comprising one or more polysaccharides, for example guars and/or guar derivatives, is disclosed in Chen et al., U.S. Pat. Publ. 2013/0036668 A1, published on Feb. 14, 2013.

Outside of the field of peat moss, various soil additives have been used and proposed to prevent evaporation, promote seed germination, and reduce drainage, for example PCT/CN2011/073298 filed Apr. 26, 2011 describes introducing a bulk additive such as guars, unwashed or washed guar gum or polymers such as polyacrylamide and poly(meth)acrylic acid to a target soil area and contacting a top layer of the target soil area with a surface additive.

There is a need in this art for improved water holding and homogeneity of wetting of peat moss.

SUMMARY OF THE INVENTION

It is an object of the present invention to improve peat moss with regard to water holding capacity, hydrophilicity, and ability to resist leaching.

This object, and others which will become apparent from the following disclosure, are achieved by the present invention which comprises in one aspect a composition comprising peat moss and one or more alkoxylates selected from the group consisting of alcohol alkoxylates and alkylphenol alkoxylates. In some embodiments the alkoxylates are ethoxylates. Optionally one or more polysaccharides is also included in the peat moss composition. In some embodiments the polysaccharide(s) is a guar and/or guar derivative (collectively referred to herein as "guar").

In another aspect, the invention comprises a method of improving the water holding capacity, hydrophilicity, and/or ability to resist leaching of peat moss comprising the step of adding one or more alcohol alkoxylates and/or alkylphenol alkoxylates.

Another aspect of the invention comprises a method of horticulture comprising planting a seed or plant which requires water and a nutrient in a composition comprising peat moss which comprises such a nutrient and one or more of the alkoxylates. Optionally, one or more polysaccharides may be incorporated into the peat moss composition in combination with the one or more alkoxylates.

DETAILED DESCRIPTION OF THE INVENTION

The term "peat moss" refers generally to large absorbent moss (genus *Sphagnum*, family Sphagnaceae) that grows in dense masses on boggy ground, where the lower parts decay slowly to form peat deposits. Peat moss is widely used in horticulture, especially for packing plants and for compost. Natural peat moss comprises nutrients which are beneficial to plant growth and preservation but is well known to be hydrophobic and difficult to wet when it is dry.

According to the present invention, varying amounts of one or more alcohol alkoxylates and/or alkylphenol alkoxylates are added to peat moss and the resultant composition has the aforementioned improved water holding capacity, hydrophilicity, and/or ability to resist leaching of nutrients and/or pesticides.

Optionally one or more polysaccharides are also added to the peat moss. Suitable polysaccharides include guar, unwashed guar gum, washed guar gum, cationic guar, carboxymethyl guar (CM guar), hydroxyethyl guar (HE guar), hydroxypropyl guar (HP guar), carboxymethylhydroxypropyl guar (CMHP guar), hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar), hydrophobically modified cationic guar (HM cationic guar), guar hydroxypropyl trimonium chloride, hydroxypropyl guar hydroxypropyl trimonium chloride, starch, corn, wheat, rice, potato, tapioca, waxy maize, sorghum, waxy sarghum, sago, dextrin, chitin, chitosan, alginate compositions, xanthan gum, carageenan gum, cassia gum, tamarind gum, cationic cellulose, cationic polycarylamide, cationic starch, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing or a combination of any of the foregoing, and the like.

Among the preferred polysaccharides are cationic guars, synthetic polyacrylamides, polysaccharides such as starch, cellulose, and the like. Cationic hydroxypropyl guar is a preferred guar. In one preferred embodiment of cationic hydroxypropyl guar, the cationic degree of substitution (DS) is from about 0.01 to about 3. In another embodiment of cationic hydroxypropyl guar, the cationic DS is from about 0.01 to 1.5. In one preferred embodiment of cationic hydroxypropyl guar, the cationic DS is from about 0.01 to 0.5. In one embodiment, the degree of hydroxyproylation, molecular substitution level (MS) is from about 0.1 to 2, more typically from about 0.1 to 1.

We have discovered that in some embodiments the combination of a guar and the one or more alkoxylates provides a synergistic effect on the water holding capacity and wetting effect on peat moss wherein the water holding capacity and wetting percentage are higher than the sum of the individual contributions of the alkoxylate and the polysaccharide.

The amount of alcohol alkoxylates and/or alkylphenol alkoxylates used can vary, however in preferred embodiments the amount used is between 2 and 30,000 parts per million (PPM) peat moss, by weight, more preferably about 500 to 5,000 PPM, and most preferably 1,000 to 3,000 PPM by weight.

The preferred polysaccharide is guar and the preferred amount, when present, is 0.1-20%, more preferably 1-8%, by weight of the alcohol alkoxylates and/or alkylphenol alkoxylates. In some embodiments the polysaccharides comprise about 5-1000 PPM of the peat moss composition, and in preferred embodiments the polysaccharide is a cationic hydroxypropyl substituted guar comprising about 10 to 200 PPM by weight of the peat moss composition. Based on alkoxylates, the guar can comprise in some embodiments about 0.1 to 20% by weight and preferably about 1 to 8% by weight of the alkoxylate.

In some embodiments the alcohol alkoxylates and/or alkylphenol alkoxylates are alcohol ethoxylates having a structure according to formula (I)

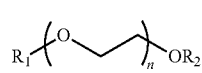

(I)

wherein $R_1$ is $C_1$-$C_{18}$ linear or branched alkyl or alkenyl;
$R_2$ is hydrogen or $CH_3$; and
n is 2-40.

Preferred alcohol ethoxylates are those wherein $R_1$ is $C_9$-$C_{15}$ linear or branched alkyl or alkenyl;
$R_2$ is hydrogen or $CH_3$; and
n is 5-8.

In one embodiment the alkoxylate is a $C_{12}$-$C_{15}$ alcohol ethoxylate with an average of about 7 EO units.

Suitable amounts of alcohol ethoxylates of formula (I) and/or alkylphenol alkoxylates are between 500 and 5000 parts guar per million (PPM) peat moss, by weight, more preferably between about 1000 and 3,000 PPM by weight alcohol ethoxylate.

We have discovered that the incorporation of the alcohol alkoxylates and/or alkylphenol alkoxylates in peat moss significantly decreases the water wetting time in a water droplet penetration time test (WDPT) and said decrease persists even after several washing processes and reduce the loss of its essential components in the washing process. We discovered that peat moss which includes both one or more alcohol or alkylphenol alkoxylates and a polysaccharide has synergistically enhanced water holding capacity.

When the optional polysaccharide is used in combination with the alcohol alkoxylates and/or alkylphenol alkoxylates, the polysaccharide can be incorporated in the peat by a variety of methods, for example by spraying or mixing guar powder, solution, suspension, and/or premix of a controlled concentration on the peat moss substrate involving one or more stationary or mixing steps. The resultant peat moss is dried or packaged as treated and then transported to a location where the peat moss is to be applied. The polysaccharide can also be applied in situ directly on peat moss substrate at the application location.

The peat moss composition if the invention can be used as a substrate or mixed with other components as a mixed substrate in applications such as plant growth, cultivation, and the like.

EXAMPLES

Experiments demonstrating hydrophilizing, anti-leaching, and increasing of water holding capacity (WHC) of peat moss by treating with alcohol alkoxylates and/or alkylphenol alkoxylates additives were conducted using the following materials, apparatus, experimental protocols, and procedures for Examples 1 and 2:

A. Materials: Peat moss: standard brown (Lambert Peat Moss, Inc®); alcohol alkoxylates and/or alkylphenol alkoxylates used consisted of $C_{12}$-$C_{15}$ linear alcohol ethoxylate (avg. 10-15 EO units) ("AE"), dialkyl phenol ethoxylate (avg. 11 EO units, C3-C7) ("APE"); polysaccharide consisted of cationic modified hydroxypropyl guar, Jaguar brand.

B. Apparatus: Kitch blender; Spray bottle: VWR® Adjustable Spray Bottle; home-made columns (3 inches in diameter, 8 inches in length, and one end sealed with 250 mesh metalscreen); Standard lab supplies: spatula, beaker, flask, vial, balance (Denver Instrument®, 0-4000 gram, precision: 0.01 grams), timer; Digital camera (option)

C. Sample Preparation:
1. 2 liters of peat moss (~240 grams) was charged into a kitchen blender
2. The blender was set on at a low setting
3. A solution (20 mL of chemicals or water) was sprayed on the top of peat moss while mixing for 1 minute D. Peat Column Wetting Test:
1. 27 grams of treated peat was transferred into each of eight columns.
2. 150 mL DI-water was poured slowly into each column.
3. Drained water was collected and weighed. The mass of retained water was calculated from mass difference.
4. The peat was poured on a pan. The percentage of wet peat was measured.

Example 1

Wetting and Water Holding Capacity Comparison Test of AE and APE

The water holding capacity and homogeneity of wetting in peat moss columns treated with alcohol ethoxylate (AE) or alkylphenol ethoxylate (APE) versus a control using deionized water were compared. The results of the comparison are set forth in Table 1.

TABLE 1

| Wetting Agent | Water Holding Capacity (g/g) | Wetting (%) |
|---|---|---|
| AE | 0.41 | 20 |
| APE | 0.33 | 21 |
| DI Water (Comparative) | 0.07 | 11 |

Wetting indicates the percentage of peat became wet in the test.

Example 2

Wetting and Water Holding Capacity Comparison Test vs. Guar Alone

The water holding capacity and homogeneity of wetting in peat moss columns treated with (A) alcohol ethoxylate (AE) alone, (B) AE with guar, versus (C) guar alone, were compared. The results demonstrate the synergistic effect of the use of a combination of AE and guar. The results of the comparison testing are set forth in Table 2.

TABLE 2

| Wetting Agent | Water Holding Capacity (g/g) | Wetting (%) |
| --- | --- | --- |
| AE | 0.48 | 37 |
| AE + Guar | 1.10 | 54 |
| Guar (Comparative) | 0.16 | 15 |

Wetting indicates the percentage of peat became wet in the test.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A composition comprising (i) peat moss; (ii) one or more alkoxylates selected from the group consisting of alcohol alkoxylates and alkylphenol alkoxylates; and, (iii) one or more polysaccharides.

2. The composition of claim 1 wherein the alkoxylate is an alcohol ethyoxylate.

3. The composition of claim 1 wherein the alkoxylate is a C12-C15 linear alcohol ethoxylate having an average of 10 to 15 ethoxylate units.

4. The composition of claim 1 wherein the alkoxylate is a C5-C10 linear alkyl substituted phenol ethoxylate having an average of 10 to 15 ethoxylate units.

5. The composition of claim 1 wherein the alkoxylate is a diamyl-substituted phenol ethoxylate having an average of 10 to 15 ethoxylate units.

6. The composition of claim 1 comprising 500-5000 parts by weight alkoxylate per million parts by weight peat moss.

7. The composition of claim 1 wherein the one or more of the polysaccharides is a guar or guar derivative.

8. The composition of claim 1 wherein the one or more polysaccharides is selected from the group consisting of cationic modified guar, hydroxypropyl guar, alkyl guar, and cationic modified hydroxypropyl guar.

9. The composition of claim 1 wherein the alcohol ethoxylate is of the formula (I)

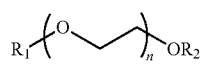

(I)

wherein R1 is C1-C18 linear or branched alkyl or alkenyl; R2 is hydrogen or CH3; and
n is 2-40.

10. The composition of claim 1 wherein the alcohol ethoxylate is of formula (I) wherein R1 is C12-C15 linear or branched alkyl or alkenyl; R2 is hydrogen or CH3; and n is 10-15.

11. A method of plant cultivation comprising planting a plant in the peat moss substrate composition of claim 1.

12. The method of claim 11 wherein the alkoxylate is C12-C15 linear alcohol ethoxylate having an average of 10-15 EO units or diamyl phenol ethoxylate having an average of 11 EO units, and the composition further comprises cationic modified hydroxypropyl guar.

13. A method of improving the hydrophilicity of, resistance to leaching of nutrients or pesticides from, and/or water holding capacity of peat moss comprising incorporating in the peat moss one or more alkoxylates selected from the group consisting of alcohol ethoxylates and alkylphenol alkoxylates; and one or more polysaccharides.

14. The method of claim 13 wherein the alkoxylate is of the formula (I)

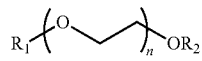

(I)

wherein R1 is C1-C18 linear or branched alkyl or alkenyl; R2 is hydrogen or CH3; and
n is 2-40.

15. The method of claim 13 wherein the alkoxylate is of formula (I)

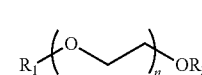

wherein R1 is C9-C15 linear or branched alkyl or alkenyl; R2 is hydrogen or CH3; and n is 5-8.

16. The method of claim 13 wherein the polysaccharide comprises one or more guar and/or guar derivatives in an amount of about 10 to 200 parts per weight per million (PPM) parts by weight peat moss in the composition.

17. The method of claim 13 wherein the alkoxylate is a C12-C15 linear alcohol ethoxylate having an average of 10-15 EO units or a diamyl phenol ethoxylate having an average of 11 EO units, and the polysaccharide comprises cationic modified hydroxypropyl guar.

* * * * *